United States Patent [19]
Okoroafor et al.

[11] Patent Number: 5,942,158
[45] Date of Patent: Aug. 24, 1999

[54] ONE-COMPONENT OPTICAL RESIN COMPOSITION

[75] Inventors: Michael O. Okoroafor, Export; Robert D. Herold, Monroeville, both of Pa.

[73] Assignee: PPG Industries Ohio, Inc., Cleveland, Ohio

[21] Appl. No.: 09/037,107

[22] Filed: Mar. 9, 1998

[51] Int. Cl.⁶ .............................. G02B 5/23; C08G 18/32
[52] U.S. Cl. ............................ 252/586; 528/76; 528/77; 528/79; 528/81; 528/85
[58] Field of Search .............................. 252/586; 528/76, 528/77, 79, 81, 85

[56] References Cited

U.S. PATENT DOCUMENTS

| | | | |
|---|---|---|---|
| 3,361,706 | 1/1968 | Meriwether et al. | 260/39 |
| 3,562,172 | 2/1971 | Hisatake et al. | 252/300 |
| 3,567,605 | 3/1971 | Becker | 204/158 |
| 3,578,602 | 5/1971 | Histake et al. | 252/300 |
| 3,898,197 | 8/1975 | Guise et al. | 528/85 |
| 3,931,117 | 1/1976 | Leonard | 528/76 |
| 3,947,426 | 3/1976 | Lander | 528/85 |
| 4,166,043 | 8/1979 | Uhlmann et al. | 252/300 |
| 4,215,010 | 7/1980 | Hovey et al. | 252/300 |
| 4,342,668 | 8/1982 | Hovey et al. | 252/586 |
| 4,367,170 | 1/1983 | Uhlmann et al. | 252/586 |
| 4,637,698 | 1/1987 | Kwak et al. | 351/163 |
| 4,689,387 | 8/1987 | Kajimoto et al. | 528/76 |
| 4,780,522 | 10/1988 | Kajimoto et al. | 528/76 |
| 4,816,584 | 3/1989 | Kwak et al. | 344/71 |
| 4,818,096 | 4/1989 | Heller et al. | 351/163 |
| 4,826,977 | 5/1989 | Heller et al. | 544/70 |
| 4,880,667 | 11/1989 | Welch | 427/160 |
| 4,892,906 | 1/1990 | Pham et al. | 524/730 |
| 4,931,219 | 6/1990 | Kwiatkowski et al. | 252/586 |
| 4,931,220 | 6/1990 | Haynes et al. | 252/586 |
| 5,059,673 | 10/1991 | Kanemura et al. | 528/67 |
| 5,066,818 | 11/1991 | Gemert et al. | 549/389 |
| 5,238,931 | 8/1993 | Yoshikawa et al. | 514/184 |
| 5,274,132 | 12/1993 | VanGemert | 549/389 |
| 5,294,666 | 3/1994 | Okada et al. | 524/609 |
| 5,352,758 | 10/1994 | Kanemura et al. | 528/85 |
| 5,384,077 | 1/1995 | Knowles | 252/586 |
| 5,405,958 | 4/1995 | VanGemert | 544/71 |
| 5,429,774 | 7/1995 | Kumar | 252/586 |
| 5,446,398 | 8/1995 | Van Gemert et al. | 252/586 |
| 5,498,686 | 3/1996 | Effer | 528/76 |
| 5,594,088 | 1/1997 | Nagata et al. | 528/77 |
| 5,608,115 | 3/1997 | Okazaki et al. | 568/61 |
| 5,631,339 | 5/1997 | Faler et al. | 528/45 |
| 5,633,297 | 5/1997 | Valko et al. | 528/85 |
| 5,652,321 | 7/1997 | Kawauchi et al. | 528/76 |
| 5,679,756 | 10/1997 | Zhu et al. | 528/65 |
| 5,693,738 | 12/1997 | Okazaki et al. | 528/51 |

FOREIGN PATENT DOCUMENTS

| | | |
|---|---|---|
| 0 802 431 | 10/1997 | European Pat. Off. . |
| 0 803 743 | 10/1997 | European Pat. Off. . |
| 0 803 744 | 10/1997 | European Pat. Off. . |

OTHER PUBLICATIONS

*Techniques in Chemistry*, vol. III, "Photocromism," Chapter 3, Glenn H. Brown, Editor, John Wiley and Sons, Inc., New York, (1971).

*The Bausch & Lomb ABBE–3L Refractomerter, Operator's Manual*, cover and p. 8, (No Date Available).

Primary Examiner—Philip Tucker
Attorney, Agent, or Firm—Irwin M. Stein; James R. Franks

[57] ABSTRACT

Described is a polymerizable organic composition comprising at least one capped polyisocyanate having nonfugitive capping groups, e.g., a 1H-azole, a polythiol having two or more thiol groups, and optionally a reactive hydrogen compound selected from polyols, compounds having both hydroxy and thiol groups, and mixtures thereof. A polymerizate, having a thickness of at least 0.5 millimeters, e.g., an optical lens, obtained from the composition of the present invention has an initial Barcol hardness of at least 1, a refractive index of at least 1.57 and an Abbe number of at least 33. Also described are photochromic articles prepared from such polymerizates.

16 Claims, No Drawings

ONE-COMPONENT OPTICAL RESIN COMPOSITION

DESCRIPTION OF THE INVENTION

The present invention relates to one-component organic compositions and 0.5 millimeter or thicker polymerizates having a refractive index of at least 1.57, an Abbe number of at least 33 and an initial Barcol hardness of at least 1 prepared from such compositions. More particularly, the present invention relates to certain one-component organic compositions comprising at least one capped polyisocyanate having nonfugitive capping groups and at least one polythiol.

A number of organic polymeric materials, e.g., plastics, have been developed as alternatives and replacements for glass in applications such as optical lenses, fiber optics, windows and automotive, nautical and aviation transparencies. As used herein, the term 'glass' is meant to refer to silica-based inorganic glass. These organic polymeric materials can provide advantages relative to glass, including, shatter resistance, lighter weight for a given application, ease of molding and ease of dying. Representative examples of such polymeric materials include, poly(methyl methacrylate), thermoplastic polycarbonate, poly[diethylene glycol bis(allylcarbonate)] and polyurethanes.

The refractive indices of many polymeric materials are generally lower than that of glass. For example, the refractive index of poly(diethylene glycol bis(allylcarbonate)) is about 1.50, compared to that of high index glass, which can range, for example, from 1.60 to 1.80. When fabricating lenses to correct a given degree of visual defect, e.g., a correction for myopia, the use of a polymeric material having a lower refractive index will require a thicker lens relative to a material having a higher refractive index, e.g., high index glass. If the degree of correction required is substantial, e.g., in the case of severe myopia, a lens fabricated from a low index polymeric material can become so thick as to negate any benefit of reduction in weight relative to an equivalent degree of correction obtained from a higher refractive index lens, e.g., a high index glass lens. In addition, thicker optical lenses are not aesthetically desirable.

The materials from which lenses, and in particular optical lenses, are fabricated can be categorized by their refractive indices. As is known to those of ordinary skill in the art, low indices typically include indices of refraction of from less than 1.50 through 1.53; middle indices comprise indices of refraction of from 1.54 through 1.57; and high indices commonly include indices of refraction of 1.58 and greater. Lenses prepared from polymeric materials having high refractive indices typically also have lower Abbe numbers (also known as nu-values). Lower Abbe numbers are indicative of an increasing level of chromatic dispersion, which is typically manifested as an optical distortion at or near the rim of the lens.

It is known that polymeric materials, e.g., optical materials and lenses, having refractive indices of greater than 1.50 can be prepared from polyisocyanates and polythiols, as described in, for example, U.S. Pat. Nos. 4,689,387, 4,780,522, 5,059,673, 5,294,666, 5,352,758, 5,594,088, 5,608,115, 5,679,756, 5,652,321 and 5,693,738. The polyisocyanates used in preparing optical materials typically have free, i.e., unblocked or uncapped, isocyanate groups. Free isocyanates can pose a potential health risk to those who handle or otherwise work with them, requiring the presence of appropriate health and safety engineering controls, e.g., extra ventilation and air supplied containment suits. In addition, the presence of free isocyanates decreases the pot-life of such compositions, requiring that the polyisocyanates and polythiols be kept separate, i.e., as a two-package or two-component composition, prior to use. The use of two-package compositions typically requires that the components be combined in the proper proportions and then quickly used, e.g., injected into a glass mold, before the combined components gel or vitrify.

The use of blocked or capped polyisocyanates to prepare polyurethane polymerizates, such as coatings, for example as described in U.S. Pat. Nos. 4,892,906, 5,633,297 and 5,631,339, is known. Polyurethane coatings prepared from capped polyisocyanates typically have cured thicknesses of less than 10 mils (250 microns) and more typically less than 5 mils (125 microns). Capped polyisocyanates are generally not used to prepare polyurethane polymerizates having thicknesses in excess of these recited values due to defects resulting from, for example, the entrapment of capping groups and in particular, fugitive, e.g., volatile, capping groups within the forming 3-dimensional network. Entrapment of fugitive capping groups can result in, for example, foaming of the polymerizate, an opaque polymerizate, an undercured polymerizate that is either too soft or too brittle, and combinations of these defects.

It is accordingly desirable then to develop single component compositions containing capped polyisocyanates that can be used to prepare a polymerizate having a thickness of at least 0.5 millimeters, e.g., an optical lens, that possesses a high refractive index, an adequately high Abbe number, e.g., preferably at least 33 and more preferably at least 351 and an initial Barcol hardness of at least 1.

In accordance with the present invention there is provided a polymerizable organic composition comprising:
 (a) at least one capped polyisocyanate having at least two capped isocyanate groups, said capped polyisocyanate being substantially free of uncapped isocyanate groups, the capping groups of said capped polyisocyanate being nonfugitive capping groups;
 (b) at least one polythiol having at least two thiol groups; and
 (c) optionally a reactive hydrogen compound having at least two reactive hydrogen groups, which is different than said polythiol (b), said reactive hydrogen compound being selected from the group consisting of polyols, compounds having both hydroxy and thiol groups, and mixtures of said reactive hydrogen compounds. A polymerizate having a thickness of at least 0.5 millimeters, prepared from the composition of the present invention possesses: a refractive index of at least 1.57, as determined in accordance with American Standard Test Method (ASTM) number D 542-95; an Abbe number, i.e., a nu-value, of at least 33, as determined using an appropriate instrument, e.g., a Bausch & Lomb ABBE-3L Refractometer; and an initial Barcol hardness (commonly referred to as a zero second Barcol hardness) of at least 1, as determined in accordance with ASTM No. D 2583-95.

Unless otherwise indicated, all numbers expressing quantities of ingredients or reaction conditions used herein are to be understood as modified in all instances by the term "about".

DETAILED DESCRIPTION OF THE INVENTION

The polymerizable organic composition of the present invention includes a capped polyisocyanate as described above. By "capped polyisocyanate" is meant a monomer or prepolymer having terminal and/or pendent capped isocyanate groups which can be converted, under controlled conditions, to decapped, i.e., free, isocyanate groups and separate or free capping groups. The capping groups of the capped polyisocyanate are preferably nonfugitive. By "nonfugitive capping groups" is meant a capping group, which, upon decapping or deblocking from the isocyanate group, remains substantially within the forming polymerizate. The nonfugitive capping group further preferably does not interfere appreciably with the reaction between the resulting free isocyanate group and either of the polythiol (b) or reactive hydrogen compound (c). While not intending to be bound by any theory, depending on the type of nonfugitive capping groups selected, they are thought to: remain in the polymerizate and act as plastisizers; react with other nonfugitive capping groups to form oligomeric species within the polymerizate, e.g., oligomeric polyamides in the case of epsilon-caprolactam (e-caprolactam); or react with decapped isocyanate or reactive hydrogen groups to form polymeric species.

Examples of capping groups that may be used as the nonfugitive capping groups of the capped polyisocyanates of the present invention include, but are not limited to: 1H-azoles, e.g., 1H-imidazole, 1H-pyrazole, 3,5-dimethyl-1H-pyrazole, 1H-1,2,3-triazole, 1H-1,2,3-benzotriazole, 1H-1,2,4-triazole, 1H-5-methyl-1,2,4-triazole and 1H-3-amino-1,2,4-triazole; lactams, e.g., e-caprolactam and 2-pyrolidinone; and others including, morpholine, 3-aminopropyl morpholine and N-hydroxy phthalimide.

The composition of the present invention is preferably a single-component composition. To ensure that the polymerizable composition will have an optimum stability, e.g., storage stability, the capped polyisocyanate is preferably substantially free of uncapped isocyanate groups. While the presence of some uncapped isocyanate groups can be tolerated, it is preferable that this level is less than that which would degrade the stability of the composition.

Classes of polyisocyanates from which the polyisocyanate of the capped polyisocyanate may be selected include, but are not limited to: aliphatic polyisocyanates; ethylenically unsaturated polyisocyanates; alicyclic polyisocyanates; aromatic polyisocyanates wherein the isocyanate groups are not bonded directly to the aromatic ring, e.g., α,α'-xylene diisocyanate; aromatic polyisocyanates wherein the isocyanate groups are bonded directly to the aromatic ring, e.g., benzene diisocyanate; aliphatic polyisocyanates containing sulfide linkages; aromatic polyisocyanates containing sulfide or disulfide linkages; aromatic polyisocyanates containing sulfone linkages; sulfonic ester-type polyisocyanates, e.g., 4-methyl-3-isocyanatobenzenesulfonyl-4'-isocyanato-phenol ester; aromatic sulfonic amide-type polyisocyanates; sulfur-containing heterocyclic polyisocyanates, e.g., thiophene-2,5-diisocyanate; halogenated, alkylated, alkoxylated, nitrated, carbodiimide modified, urea modified and biuret modified derivatives of polyisocyanates belonging to these classes; and dimerized and trimerized products of polyisocyanates belonging to these classes.

Examples of aliphatic polyisocyanates from which the polyisocyanate of the capped polyisocyanate may be selected include, but are not limited to, ethylene diisocyanate, trimethylene diisocyanate, tetramethylene diisocyanate, hexamethylene diisocyanate, octamethylene diisocyanate, nonamethylene diisocyanate, 2,2'-dimethylpentane diisocyanate, 2,2,4-trimethylhexane diisocyanate, decamethylene diisocyanate, 2,4,4,-trimethylhexamethylene diisocyanate, 1,6,11-undecanetriisocyanate, 1,3,6-hexamethylene triisocyanate, 1,8-diisocyanato-4-(isocyanatomethyl)octane, 2,5,7-trimethyl-1,8-diisocyanato-5-(isocyanatomethyl)octane, bis (isocyanatoethyl)-carbonate, bis(isocyanatoethyl)ether, 2-isocyanatopropyl-2,6-diisocyanatohexanoate, lysinediisocyanate methyl ester and lysinetriisocyanate methyl ester.

Examples of ethylenically unsaturated polyisocyanates from which the polyisocyanate of the capped polyisocyanate may be selected include but are not limited to, butene diusocyanate and 1,3-butadiene-1,4-diisocyanate. Alicyclic polyisocyanates that are useful in the present invention include, but are not limited to, isophorone diisocyanate, cyclohexane diisocyanate, methylcyclohexane diisocyanate, bis(isocyanatomethyl)cyclohexane, bis(isocyanatocyclohexyl)methane, bis(isocyanatocyclohexyl)- 2,2-propane, bis (isocyanatocyclohexyl)-1,2-ethane, 2-isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo [2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo[2.2.1]-heptane and 2-isocyanatomethyl-2-(3-isocyanatopropyl)-6-(2-isocyanatoethyl)-bicyclo[2.2.1]-heptane.

Examples of aromatic polyisocyanates wherein the isocyanate groups are not bonded directly to the aromatic ring include, but are not limited to, bis(isocyanatoethyl)benzene, α,α,α',α'-tetramethylxylene diisocyanate, 1,3-bis(1-isocyanato-1-methylethyl)benzene, bis(isocyanatobutyl) benzene, bis(isocyanatomethyl)naphthalene, bis (isocyanatomethyl)diphenyl ether, bis(isocyanatoethyl) phthalate, mesitylene triisocyanate and 2,5-di (isocyanatomethyl)furan. Aromatic polyisocyanates, having isocyanate groups bonded directly to the aromatic ring, from which the polyisocyanate of the capped polyisocyanate may be selected include, but are not limited to, phenylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, naphthalene diisocyanate, methylnaphthalene diisocyanate, biphenyl diisocyanate, ortho-tolidine diisocyanate, 4,4'-diphenylmethane diisocyanate, bis(3-methyl-4-isocyanatophenyl)methane, bis(isocyanatophenyl) ethylene, 3,3'-dimethoxy-biphenyl-4,4'-diisocyanate, triphenylmethane triisocyanate, polymeric 4,4'-diphenylmethane diisocyanate, naphthalene triisocyanate, diphenylmethane-2,4,4'-triisocyanate, 4-methyldiphenylmethane-3,5,2',4',6'-pentaisocyanate, diphenylether diisocyanate, bis (isocyanatophenylether)ethyleneglycol, bis(isocyanatophenylether)-1,3-propyleneglycol, benzophenone diisocyanate, carbazole diisocyanate, ethylcarbazole diisocyanate and dichlorocarbazole diisocyanate.

Aliphatic polyisocyanates containing sulfide linkages from which the polyisocyanate of the capped polyisocyanate may be selected include, but are not limited to, thiodiethyl diisocyanate, thiodipropyl diisocyanate, dithiodihexyl diisocyanate, dimethylsulfone diisocyanate, dithiodimethyl diisocyanate, dithiodiethyl diisocyanate, dithiodipropyl diisocyanate and dicyclohexylsulfide-4,4'-diisocyanate. Examples of aromatic polyisocyanates containing sulfide or disulfide linkages include, but are not limited to, diphenylsulfide-2,4'-diisocyanate, diphenylsulfide-4,4'- diisocyanate, 3,3'-dimethoxy-4,4,-diisocyanatodibenzyl thioether, bis(4-isocyanatomethylbenzene)-sulfide, diphenyldisulfide-4,4'-diisocyanate, 2,2'-dimethyl-diphenyldisulfide-5,5'-diisocyanate, 3,3'-dimethyl-diphenyldisulfide-5,5'-diisocyanate, 3,3'-dimethyl-diphenyldisulfide-6,6'-diisocyanate, 4,4'-dimethyl-diphenyldisulfide-5,5'-diisocyanate, 3,3'-dimethoxy-diphenyldisulfide-4,4'-diisocyanate and 4,4'-dimethoxy-diphenyldisulfide-3,3,-diisocyanate.

Aromatic polyisocyanates containing sulfone linkages from which the polyisocyanate of the capped polyisocyanate may be selected include, but are not limited to, diphenylsulfone-4,4'-diisocyanate, diphenylsulfone-3,3'-diisocyanate, benzidinesulfone-4,4,-diisocyanate, diphenylmethanesulfone-4,4'-diisocyanate, 4-methyldiphenylmethanesulfone-2,4'-diisocyanate, 4,4'-dimethoxydiphenylsulfone-3,3'-diisocyanate, 3,3'-dimethoxy-4,4'-diisocyanatodibenzylsulfone, 4,4'-dimethyldiphenylsulfone-3,3'-diisocyanate, 4,4'-di-tert-butyl-diphenylsulfone-3,3'-diisocyanate and 4,4'-dichlorodiphenylsulfone-3,3'-diisocyanate.

Examples of aromatic sulfonic amide-type polyisocyanates from which the polyisocyanate of the capped polyisocyanate may be selected include, but are not limited to, 4-methyl-3-isocyanato-benzene-sulfonylanilide-3'-methyl-4'-isocyanate, dibenzenesulfonyl-ethylenediamine-4,4'-diisocyanate, 4,4'-methoxybenzenesulfonyl-ethylenediamine-3,3'-diisocyanate and 4-methyl-3-isocyanato-benzene-sulfonylanilide-4-ethyl-3'-isocyanate.

Preferred polyisocyanates from which the polyisocyanate of the capped polyisocyanate may be selected include, α,α'-xylene diisocyanate, α,α,α',α'-tetramethylxylene diisocyanate, isophorone diisocyanate, bis(isocyanatocyclohexyl)methane, toluene diisocyanate, 4,4'-diphenylmethane diisocyanate and mixtures thereof.

In one embodiment of the present invention, the capped polyisocyanate is a capped polyisocyanate prepolymer having at least two capped isocyanate groups. The capped polyisocyanate prepolymer may have structural linkages within its backbone selected from the group consisting of urethane, i.e., —NH—C(O)—O—, thiourethane, i.e., —NH—C(O)—S—, urea, e.g., —NH—C(O)—NH—, and combinations of these structural linkages. The capped polyisocyanate prepolymer can be prepared from one or more monomers having at least two reactive hydrogen groups, e.g., thiol, hydroxy, primary amine and secondary amine groups, and one or more monomers having two or more isocyanate groups. The molar equivalent ratio of reactive hydrogen groups to isocyanate groups is selected such that the resulting prepolymer will have the desired end groups, i.e., isocyanate groups. After the prepolymer has been formed, the isocyanate end groups are then capped with a nonfugitive capping group.

Examples of polyols, polythiols and compounds having both hydroxy and thiol groups that may be used in preparing the capped polyisocyanate prepolymer include, but are not limited to, those listed below for use as the polythiol (b) and the reactive hydrogen compound (c). Primary and secondary polyamines that may be used in this preparation include, for example, any of the family of ethyleneamines, e.g., ethyl-enediamine (EDA), diethylenetriamine (DETA), triethylene-tetramine (TETA), tetraethylenepentamine (TEPA), penta-ethylenehexamine (PEHA), piperazine, i.e., diethylenediamine (DEDA), and 2-amino-1-ethylpiperazine. Suitable monomers having two or more isocyanate groups include, but are not limited to, those listed above from which the polyisocyanate of the capped polyisocyanate may be selected.

The capped polyisocyanate prepolymer may be used alone or in combination with one or more non-polymeric capped polyisocyanates as described and listed above. The number average molecular weight (Mn) of the capped polyisocyanate prepolymer is typically less than 50,000, preferably less than 20,000, and more preferably less than 10,000 grams/mole, as determined by gel permeation chromatography (GPC) using polystyrene standards. Preferably the capped polyisocyanate prepolymer is a polyurethane prepolymer having at least two capped isocyanate groups.

The polymerizable organic composition of the present invention includes a polythiol having two or more thiol groups. As used herein, by "thiol", "thiol group", "mercapto" or "mercapto group" is meant an —SH group which is capable of forming a thiourethane linkage, i.e., —NH—C(O)—S—, with a decapped or free isocyanate group.

Examples of polythiols useful in the present invention include, but are not limited to, 2,2'-thiodiethanethiol, pentaerythritol tetrakis(3-mercaptopropionate), pentaerythritol tetrakis(2-mercaptoacetate), trimethylolpropane tris(3-mercaptopropionate), trimethylolpropane tris(2-mercaptoacetate), 4-mercaptomethyl-3,6-dithia-1,8-octanedithiol, 4-tert-butyl-1,2-benzenedithiol, 4,4'-thiodibenzenethiol, benzenedithiol, 4,4'-isopropylidenediphenol bis(2-mercaptoacetate), 4,4'-isopropylidenediphenol bis(3-mercaptopropionate), ethylene glycol di(2-mercaptoacetate), ethylene glycol di(3-mercaptopropionate), polyethylene glycol di(2-mercaptoacetate), polyethylene glycol di(3-mercaptopropionate) and mixtures thereof. Additional examples of polythiols suitable for use in the present invention include those listed in U.S. Pat. No. 5,693,738 from column 7, line 38 through column 9, line 49, the disclosure of which is incorporated herein by reference. Preferred polythiols include, 2,2'-thiodiethanethiol, pentaerythritol tetrakis(2-mercaptoacetate), pentaerythritol tetrakis(3-mercaptopropionate) and mixtures thereof.

Another preferred polythiol may be represented by the following general formula I,

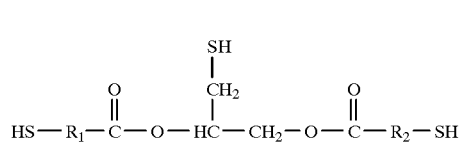

wherein $R_1$ and $R_2$ are each selected from the group consisting of straight or branched chain alkylene (usually containing from 1 to 20 carbon atoms, e.g., 1 to 10 carbon atoms, preferably 1 to 4 carbon atoms and more preferably 1 to 2 carbon atoms), cyclic alkylene (usually containing from 5 to 8 carbon atoms), phenylene and $C_1$–$C_9$ alkyl substituted phenylene.

With reference to general formula I, examples of straight or branched chain alkylenes from which $R_1$ and $R_2$ may each be selected include, but are not limited to, methylene, ethylene, 1,3-propylene, 1,2-propylene, 1,4-butylene, 1,2-butylene, pentylene, hexylene, heptylene, octylene, nonylene, decylene, undecylene, octadecylene and ico-sylene. Examples of cyclic alkylenes from which $R_1$ and $R_2$ may each be selected include, but are not limited to, cyclopentylene, cyclohexylene, cycloheptylene cyclooctylene, bicyclo[2.2.1]heptylene and alkyl substituted derivatives thereof. The divalent linking groups $R_1$ and $R_2$ may also be selected from phenylene and alkyl substituted phenylene, e.g., methyl, ethyl, propyl, isopropyl and nonyl substituted phenylene. In a preferred embodiment of the present invention, $R_1$ and $R_2$ are each methylene or ethylene.

The polythiol represented by general formula I may be prepared from an esterification or transesterification reaction between 3-mercapto-1,2-propanediol (Chemical Abstract Service (CAS) Registry No. 96-27-5) and a thiol functional carboxylic acid or carboxylic acid ester in the presence of a strong acid catalyst, e.g., methane sulfonic acid, with the concurrent removal of water or alcohol from the reaction mixture. More particularly, a preferred polythiol monomer, for which $R_1$ and $R_2$ are each methylene with reference to general formula I, i.e., thioglycerol bis(2-mercaptoacetate), was prepared from the following ingredients.

| Ingredient | Amount (grams) |
|---|---|
| Charge 1 | |
| 3-mercapto-1,2-propanediol | 1995 |
| 2-mercaptoacetic acid | 2333 |
| methane sulfonic acid | 14.2 |
| Charge 2 | |
| aqueous ammonia[a] | 4218 |

[a]An aqueous solution of 5% by weight ammonia.

The ingredients of Charge 1 were added to a five liter round bottom flask equipped with a magnetic stirrer, a thermocouple and heating mantle coupled through a temperature feed-back control device, and a vacuum distillation column. A vacuum of from 5 to 10 millimeters (mm) of Hg was drawn and the reaction mixture was heated to and held at 70° C. for a period of 4 to 5 hours while water was collected off of the distillation column.

When no more water was observed to be collected from the distillation column, the reaction mixture was cooled to room temperature and transferred to a six liter round bottom flask equipped with a motor driven stir-blade, a thermocouple and a water cooled jacket. Charge 2 was added to the mixture, which was then stirred for 30 to 45 minutes with an accompanying exotherm of from 10° C. to 20° C. Upon cooling to room temperature, the reaction mixture was left standing to allow the accumulation of an upper ammonia layer, which was removed by suctioning with a pipette. The remaining lower layer was washed three times each with two liters of deionized water. Vacuum stripping of water from the washed layer yielded 1995 grams of thioglycerol bis(2-mercaptoacetate) in the form of a yellowish oil having a refractive index of 1.5825.

As presented herein, the polythiol described and named with reference to general formula I, e.g., thioglycerol bis(2-mercaptoacetate), is meant to include also any related co-product oligomeric species and polythiol monomer compositions containing residual starting materials. For example, when washing the reaction mixture resulting from the esterification of 3-mercapto-1,2-propanediol and a thiol functional carboxylic acid, e.g., 2-mercaptoacetic acid, with excess base, e.g., aqueous ammonia, oxidative coupling of thiol groups may occur. Such an oxidative coupling can result in the formation of oligomeric polythiol species having disulfide linkages, i.e., —S—S— linkages.

Optionally included in the composition of the present invention is a reactive hydrogen compound having at least two reactive hydrogen groups, which is different than polythiol (b). As used herein, by "reactive hydrogen compound" is meant a compound having reactive hydrogen groups that are capable of forming covalent bonds with decapped isocyanate groups. The optional reactive hydrogen compound may be included in the polymerizable composition to optimize the physical properties of a polymerizate prepared therefrom.

Classes of polyols that may optionally be included in the polymerizable composition include, but are not limited to: straight or branched chain alkane polyols, e.g., 1,2-ethanediol, 1,3-propanediol, 1,2-propanediol, 1,4-butanediol, 1,3-butanediol, glycerol, neopentyl glycol, trimethylolethane, trimethylolpropane, di-trimethylolpropane, erythritol, pentaerythritol and di-pentaerythritol; polyalkylene glycols, e.g., diethylene glycol, dipropylene glycol and higher polyalkylene glycols such as polyethylene glycols having number average molecular weights of, for example, from 200 to 2000 grams/mole; cyclic alkane polyols, e.g., cyclopentanediol, cyclohexanediol, cyclohexanetriol, cyclohexanedimethanol, hydroxypropylcyclohexanol and cyclohexanediethanol; aromatic polyols, e.g., dihydroxybenzene, benzenetriol, hydroxybenzyl alcohol and dihydroxytoluene; bisphenols, e.g., 4,4'-isopropylidenediphenol; 4,4'-oxybisphenol, 4,4'-dihydroxybenzophenone, 4,4'-thiobisphenol, phenolphthlalein, bis(4-hydroxyphenyl)methane, 4,4'-(1,2-ethenediyl)bisphenol and 4,4'-sulfonylbisphenol; halogenated bisphenols, e.g., 4,4'-isopropylidenebis(2,6-dibromophenol), 4,4'-isopropylidenebis(2,6-dichlorophenol) and 4,4'- isopropylidenebis(2,3,5,6-tetrachlorophenol); alkoxylated bisphenols, e.g., alkoxylated 4,4'-isopropylidenediphenol having from 1 to 70 alkoxy groups, for example, ethoxy, propoxy, α-butoxy and β-butoxy groups; and biscyclohexanols, which can be prepared by hydrogenating the corresponding bisphenols, e.g., 4,4'-isopropylidene-biscyclohexanol, 4,4'-oxybiscyclohexanol, 4,4'-thiobiscyclohexanol and bis(4-hydroxycyclohexanol)methane.

In one embodiment of the present invention the polyol of the optional reactive hydrogen compound is a polyurethane prepolymer having two or more hydroxy groups. Hydroxy functional polyurethane prepolymers useful in the present invention can be prepared from any of the above listed polyols and one or more suitable polyisocyanates. The ratio of molar equivalents of hydroxy groups to isocyanate groups being selected such that a hydroxy functional polyurethane prepolymer having essentially no free isocyanate groups is produced. Examples of polyisocyanates suitable for preparing hydroxy functional polyurethane prepolymers include those listed above from which the polyisocyanate of the capped polyisocyanate may be selected. Hydroxy functional polyurethane prepolymers useful in the present invention typically have number average molecular weights (Mn) of less than 50,000, preferably less than 20,000, and more preferably less than 10,000 grams/mole, as determined by GPC using polystyrene standards.

Examples of optional reactive hydrogen compounds having both hydroxy and thiol groups that may be used in the present invention include, but are not limited to, 2-mercaptoethanol, 3-mercapto-1,2-propanediol, glycerin bis(2-mercaptoacetate), glycerin bis(3-mercaptopropionate), 1-hydroxy-4-mercaptocyclohexane, 2,4-dimercaptophenol, 2-mercaptohydroquinone, 4-mercaptophenol, 1,3-dimercapto-2 -propanol, 2,3-dimercapto-1-propanol, 1,2-dimercapto-1,3-butanediol, trimethylolpropane bis(2-mercaptoacetate), trimethylolpropane bis(3-mercaptopropionate), pentaerythritol mono(2-mercaptoacetate), pentaerythritol bis(2-mercaptoacetate), pentaerythritol tris(2-mercaptoacetate), pentaerythritol mono(3-mercaptopropionate), pentaerythritol bis(3-mercaptopropionate), pentaerythritol tris(3-mercaptopropionate), hydroxymethyl-tris(mercaptoethylthiomethyl)methane, 1-hydroxyethylthio-3-mercaptoethylthiobenzene, 4-hydroxy-4'-mercaptodiphenylsulfone, dihydroxyethyl sulfide mono(3-mercaptopropionate) and hydroxyethylthiomethyl-tris(mercaptoethylthio)methane.

Polymerization of the polymerizable organic composition of the present invention is typically accomplished by means of a thermal cure cycle. The thermal cure cycle utilized may vary depending on, for example, the reactivity and molar ratio of the capped isocyanate groups to the thiol and hydroxy groups, the type of nonfugitive capping group selected and the presence of any catalyst(s). Typically, the thermal cure cycle involves heating the polymerizable composition from room temperature to as high as 200° C. over a period of from 0.5 hours to 72 hours.

It is preferred that the polymerizable composition of the present invention include one or more catalysts. Examples of useful catalysts include, for example, tertiary amines, e.g., triethylamine, triisopropylamine and N,N-dimethylbenzylamine, and organometallic compounds, e.g., dibutyltin dilaurate, dibutyltin diacetate and stannous octoate. Additional examples of tertiary amines are listed in U.S. Pat. No. 5,693,738 at column 10 lines 6 through 38, the disclosure of which is incorporated herein by reference. Additional examples of organometallic compounds useful as catalysts are listed in U.S. Pat. No. 5,631,339 at column 4, lines 26 through 46, the disclosure of which is incorporated herein by reference. Catalyst levels are typically less than 5% by weight, preferably less than 3% by weight and more preferably less than 1% by weight, based on the total weight of the composition.

The capped polyisocyanate, polythiol and optional reactive hydrogen compound of the polymerizable composition are typically present in amounts sufficient to provide a molar equivalent ratio of capped isocyanate groups to (OH+SH) groups of from 0.5 to 3.0, preferably from 0.5 to 1.5, and more preferably form 0.8 to 1.2.

Various conventional additives may be incorporated into the polymerizable composition of the present invention. Such additives may include light stabilizers, heat stabilizers, antioxidants, ultraviolet light absorbers, mold release agents, static (non-photochromic) dyes, pigments and flexibilizing additives, e.g., alkoxylated phenol benzoates and poly(alkylene glycol) dibenzoates. Antiyellowing additives, e.g., 3-methyl-2-butenol, organo pyrocarbonates and triphenyl phosphite (CAS registry no. 101-02-0), may also be included in the composition to enhance resistance to yellowing. Such additives are typically present in the composition in amounts totaling less than 10% by weight, preferably less than 5% by weight, and more preferably less than 3% by weight, based on the total weight of the polymerizable composition.

Polymerizates prepared from the polymerizable composition of present invention will be solid, having a substantially continuous phase, and preferably transparent, e.g., suitable for optical or ophthalmic applications. The polymerizates of the present invention, having a thickness of at least 0.5 millimeters, will also have a refractive index of at least 1.57, preferably at least 1.58 and more preferably at least 1.59, adequately high Abbe numbers, e.g., an Abbe number of at least 33 and preferably at least 35, and an initial Barcol hardness of at least 1. The reactants and compounds comprising the composition of the present invention are selected and combined in amounts that allow the preparation of a polymerizate therefrom, which possesses the above listed characteristics. Solid articles that may be prepared from one-component polymerizable organic compositions of the present invention include, but are not limited to, optical lenses, such as plano and ophthalmic lenses, sun lenses, windows, automotive transparencies, e.g., windshields, sidelights and backlights, and aircraft transparencies, etc.

When used to prepare photochromic articles, e.g., lenses, the polymerizate should be transparent to that portion of the electromagnetic spectrum which activates the photochromic substance(s) incorporated in the matrix, i.e., that wavelength of ultraviolet (UV) light that produces the colored or open form of the photochromic substance and that portion of the visible spectrum that includes the absorption maximum wavelength of the photochromic substance in its UV activated form, i.e., the open form. Photochromic substances that may be utilized with the polymerizates of the present invention are organic photochromic compounds or substances containing same that may be incorporated, e.g., dissolved, dispersed or diffused into such polymerizates.

A first group of organic photochromic substances contemplated for use to form the photochromic articles of the present invention are those having an activated absorption maximum within the visible range of greater than 590 nanometers, e.g., between greater than 590 to 700 nanometers. These materials typically exhibit a blue, bluish-green, or bluish-purple color when exposed to ultraviolet light in an appropriate solvent or matrix. Examples of classes of such substances that are useful in the present invention include, but are not limited to, spiro(indoline)naphthoxazines and spiro(indoline)benzoxazines. These and other classes of such photochromic substances are described in the open literature. See for example, U.S. Pat. Nos. 3,562,172; 3,578,602; 4,215,010; 4,342,668; 5,405,958; 4,637,698; 4,931,219; 4,816,584; 4,880,667; 4,818,096. Also see for example: Japanese Patent Publication 62/195383; and the text, *Techniques in Chemistry,* Volume III, "Photochromism," Chapter 3, Glenn H. Brown, Editor, John Wiley and Sons, Inc., New York, 1971.

A second group of organic photochromic substances contemplated for use to form the photochromic articles of the present invention are those having at least one absorption maximum and preferably two absorption maxima, within the visible range of between 400 and less than 500 nanometers. These materials typically exhibit a yellow-orange color when exposed to ultraviolet light in an appropriate solvent or matrix. Such compounds include certain chromenes, i.e., benzopyrans and naphthopyrans. Many of such chromenes are described in the open literature, e.g., U.S. Pat. Nos. 3,567,605; 4,826,977; 5,066,818; 4,826,977; 5,066,818; 5,466,398; 5,384,077; 5,238,931; and 5,274,132.

A third group of organic photochromic substances contemplated for use to form the photochromic articles of the present invention are those having an absorption maximum within the visible range of between 400 to 500 nanometers and another absorption maximum within the visible range of between 500 to 700 nanometers. These materials typically exhibit color(s) ranging from yellow/brown to purple/gray when exposed to ultraviolet light in an appropriate solvent or matrix. Examples of these substances include certain benzopyran compounds, having substituents at the 2-position of the pyran ring and a substituted or unsubstituted heterocyclic ring, such as a benzothieno or benzofurano ring fused to the benzene portion of the benzopyran. Such materials are the subject of U.S. Pat. No. 5,429,774.

Other photochromic substances contemplated are photochromic organo-metal dithizonates, i.e., (arylazo)- thioformic arylhydrazidates, e.g., mercury dithizonates which are described in, for example, U.S. Pat. No. 3,361,706. Fulgides and fulgimides, e.g. the 3-furyl and 3-thienyl fulgides and fulgimides which are described in U.S. Pat. No. 4,931,220 at column 20, line 5 through column 21, line 38.

The disclosures relating to such photochromic substances in the aforedescribed patents are incorporated herein, in toto, by reference. The photochromic articles of the present invention may contain one photochromic substance or a mixture of photochromic substances, as desired. Mixtures of photochromic substances may be used to attain certain activated colors such as a near neutral gray or brown.

Each of the photochromic substances described herein may be used in amounts and in a ratio (when mixtures are used) such that a polymerizate to which the mixture of compounds is applied or in which they are incorporated exhibits a desired resultant color, e.g., a substantially neutral color such as shades of gray or brown when activated with unfiltered sunlight, i.e., as near a neutral color as possible given the colors of the activated photochromic substances. The relative amounts of the aforesaid photochromic substances used will vary and depend in part upon the relative intensities of the color of the activated species of such compounds, and the ultimate color desired.

The photochromic compounds or substances described herein may be applied to or incorporated into the polymerizate by various methods described in the art. Such methods include dissolving or dispersing the substance within the polymerizate, e.g., imbibition of the photochromic substance into the polymerizate by immersion of the polymerizate in a hot solution of the photochromic substance or by thermal transfer; providing the photochromic substance as a separate layer between adjacent layers of the polymerizate, e.g., as a part of a polymer film; and applying the photochromic substance as part of a coating placed on the surface of the polymerizate. The term "imbibition" or "imbibe" is intended to mean and include permeation of the photochromic substance alone into the polymerizate, solvent assisted transfer absorption of the photochromic substance into a porous polymer, vapor phase transfer, and other such transfer mechanisms.

The amount of photochromic substance or composition containing same applied to or incorporated into the polymerizate is not critical provided that a sufficient amount is used to produce a photochromic effect discernible to the naked eye upon activation. Generally such amount can be described as a photochromic amount. The particular amount used depends often upon the intensity of color desired upon irradiation thereof and upon the method used to incorporate or apply the photochromic substances. Typically, the more photochromic substance applied or incorporated, the greater is the color intensity. Generally, the amount of total photochromic substance incorporated into or applied to a photochromic optical polymerizate may range from 0.15 to 0.35 milligrams per square centimeter of surface to which the photochromic substance(s) is incorporated or applied.

It is also contemplated that photochromic substances may be added to the polymerizable organic composition prior to polymerizing, e.g., cast curing, the composition. However, when this is done it is preferred that the photochromic substance(s) be resistant to potentially adverse interactions with, for example, initiator(s) that may be present and/or the thiol, capped isocyanate, decapped isocyanate and nonfugitive capping groups of the composition. These adverse interactions can result in deactivation of the photochromic substance(s), e.g., by trapping them in either an open or closed form. Photochromic substances can also include photochromic pigments and organic photochromic substances encapsulated in metal oxides, the latter of which are described in U.S. Pat. Nos. 4,166,043 and 4,367,170. Organic photochromic substances sufficiently encapsulated within a matrix of an organic polymerizate, as described in U.S. Pat. No. 4,931,220, may also be incorporated into the composition of the present invention prior to curing.

The present invention has been described with reference to specific details of particular embodiments thereof. It is not intended that such details be regarded as limitations upon the scope of the invention except insofar as and to the extent that they are included in the accompanying claims.

We claim:

1. A polymerizable organic composition comprising:

(a) at least one capped polyisocyanate having at least two capped isocyanate groups, said capped polyisocyanate being substantially free of uncapped isocyanate groups, the capping groups of said capped polyisocyanate being nonfugitive capping groups;

(b) at least one polythiol having at least two thiol groups; and (c) optionally a reactive hydrogen compound having at least two reactive hydrogen groups, which is different than said polythiol (b), said reactive hydrogen compound being selected from the group consisting of polyols, compounds having both hydroxy and thiol groups, and mixtures of said reactive hydrogen compounds; provided that a polymerizate of said polymerizable organic composition having a thickness of at least 0.5 millimeters, has an initial Barcol hardness of at least 1, a refractive index of at least 1.57 and an Abbe number of at least 33.

2. The polymerizable organic composition of claim 1 wherein said nonfugitive capping group is selected from the group consisting of 1H-azoles, lactams and mixtures thereof.

3. The polymerizable organic composition of claim 2 wherein said nonfugitive capping group is selected from the group consisting of 1H-1,2,4-triazole and e-caprolactam.

4. The polymerizable organic composition of claim 1 wherein the polyisocyanate of said capped polyisocyanate is selected from the group consisting of $\alpha,\alpha'$-xylene diisocyanate, $\alpha,\alpha,\alpha',\alpha'$-tetramethylxylene diisocyanate, isophorone diisocyanate, bis(isocyanatocyclohexyl)methane, toluene diisocyanate, 4,4'-diphenylmethane diisocyanate and mixtures thereof.

5. The polymerizable organic composition of claim 1 wherein said capped polyisocyanate is a capped polyisocyanate prepolymer having at least two capped isocyanate groups, said capped polyisocyanate prepolymer having structural linkages within its backbone selected from the group consisting of urethane, thiourethane, urea and combinations thereof.

6. The polymerizable organic composition of claim 5 wherein said capped polyisocyanate prepolymer is a capped polyisocyanate polyurethane prepolymer.

7. The polymerizable organic composition of claim 1 wherein said reactive hydrogen compound is a polyurethane prepolymer having at least two hydroxy groups.

8. The polymerizable organic composition of claim 1 wherein said polythiol is selected from the group consisting of 2,2"-thiodiethanethiol, pentaerythritol tetrakis(2-mercaptoacetate), pentaerythritol tetrakis(3-mercaptopropionate), a polythiol represented by the following general formula,

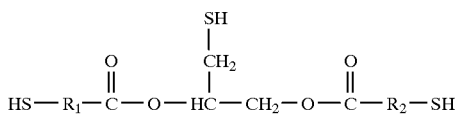

wherein $R_1$ and $R_2$ are each selected from the group consisting of straight or branched chain alkylene, cyclic alkylene, phenylene and $C_1$–$C_9$ alkyl substituted phenylene, and mixtures of said polythiols.

9. The polymerizable organic composition of claim 8 wherein said capped polyisocyanate is a capped polyisocyanate polyurethane prepolymer having at least two capped isocyanate groups.

10. The polymerizable organic composition of claim 9 wherein $R_1$ and $R_2$ are each selected from the group consisting of methylene and ethylene.

11. The polymerizable organic composition of claim 10 wherein the nonfugitive capping group of said capped polyisocyanate polyurethane prepolymer is selected from the group consisting of 1H-1,2,4-triazole, e-caprolactam and mixtures thereof.

12. The polymerizate of claim 1.

13. The polymerizate of claim 11.

14. A photochromic article comprising:
    (a) the polymerizate of claim 1; and
    (b) a photochromic amount of organic photochromic substance.

15. A photochromic article comprising:
    (a) the polymerizate of claim 11; and
    (b) a photochromic amount of organic photochromic substance.

16. The photochromic article of claim 15 wherein the organic photochromic substance is selected from the group consisting of spiro(indoline)naphthoxazines, spiro(indoline)benzoxazines, benzopyrans, naphthopyrans, chromenes, organo-metal dithizonates, fulgides and fulgimides and mixtures of such organic photochromic substances.

* * * * *